United States Patent [19]

Burley

[11] Patent Number: 5,023,451

[45] Date of Patent: Jun. 11, 1991

[54] INDICIA CONTRAST ENHANCEMENT FOR VEHICLE BORNE INFRARED VISION SYSTEM

[75] Inventor: Harvey A. Burley, Troy, Mich.

[73] Assignee: General Motors Corporation, Detroit, Mich.

[21] Appl. No.: 481,404

[22] Filed: Feb. 20, 1990

[51] Int. Cl.[5] ........................ G06K 9/00; G06K 19/06; G01J 5/02; G01J 5/06

[52] U.S. Cl. .................................... 250/330; 250/341; 40/582; 350/97; 350/109

[58] Field of Search ............... 250/330, 340, 341, 342; 40/582, 583, 559, 561, 562, 612; 350/1.1, 109, 97, 103

[56] References Cited

U.S. PATENT DOCUMENTS

| | | | |
|---|---|---|---|
| 4,368,979 | 1/1983 | Ruell | 356/71 |
| 4,733,079 | 3/1988 | Adams et al. | 250/341 |
| 4,795,906 | 1/1989 | Adams et al. | 250/341 |

*Primary Examiner*—Constantine Hannaher
*Assistant Examiner*—Edward J. Glick
*Attorney, Agent, or Firm*—Tim G. Jaeger

[57] ABSTRACT

In conjunction with a vehicle borne infrared receiver, sign indicia are defined by infrared reflective surfaces oriented so as to reflect infrared radiation to the receiver from a contrast enhancing source of radiation such as the sky and/or the ground thereby improving the contrast of the sign indicia within the displayed image.

1 Claim, 1 Drawing Sheet

INDICIA CONTRAST ENHANCEMENT FOR VEHICLE BORNE INFRARED VISION SYSTEM

FIELD OF INVENTION

This invention relates to an enhancement for use in conjunction with a vehicle borne infrared vision system. More particularly, the invention provides an improvement for increasing within the infrared image scene produced by such a system, the contrast between a particular indicia and an adjacent portion of the scene.

BACKGROUND OF INVENTION

Infrared vision systems can be utilized in vehicles such as cars and trucks to improve driver vision at night and in rain, fog and snow. Such an infrared vision system typically includes a receiver for detecting infrared radiation received from a scene and a monitor for displaying an image of the detected scene. The amount of contrast between different portions of the displayed image is based upon the amount of detectible difference in the intensity of the infrared radiation received from the corresponding portions of the scene. Indicia appearing on traffic signs and the like can be difficult (if not impossible) to discern within the displayed image because the contrast between the indicia and the adjacent portions of the image is so low, i.e., the amount of radiation detected by the infrared receiver from the indicia and from surrounding portions of the sign is about the same. The invention addresses this problem.

SUMMARY OF INVENTION

According to one aspect of the invention, the indicia to be better contrasted within the displayed image is defined, at least in part, by a plurality of infrared reflective surfaces oriented so as to reflect infrared radiation to the receiver from a contrast enhancing source of radiation. The intensity of the contrast enhancing infrared radiation is detectibly different from the intensity of the background infrared radiation received from the adjacent portions of the scene by an amount which is greater than would be the case in the absence of the reflective surfaces. As a result, the contrast of the indicia within the displayed image is improved.

In another aspect of the invention, the intensity of the contrast enhancing radiation may be less than the intensity of the background radiation, e.g., where the contrast enhancing radiation source is the sky or some other source having an effective infrared temperature lower than that of the background. Alternatively, the intensity of the contrast enhancing radiation may be greater than the intensity of the background radiation, e.g., where the contrast enhancing radiation source is the ground or some other source having an effective infrared temperature higher than that of the background.

In an additional aspect of the invention, the infrared reflective surfaces may be made of a material that is also either transparent or reflective to visible radiation so as to provide visible as well as infrared image contrast for the indicia. Glass, plastics and metals are among the materials that may be suitable for use as the reflective surfaces of the invention.

BRIEF DESCRIPTION OF DRAWINGS

The foregoing and other aspects and advantages of the invention may be best understood by reference to the following detailed description of the preferred embodiments when taken in conjunction with the accompanying drawings in which.

DESCRIPTION OF PREFERRED EMBODIMENTS

Figure 1:
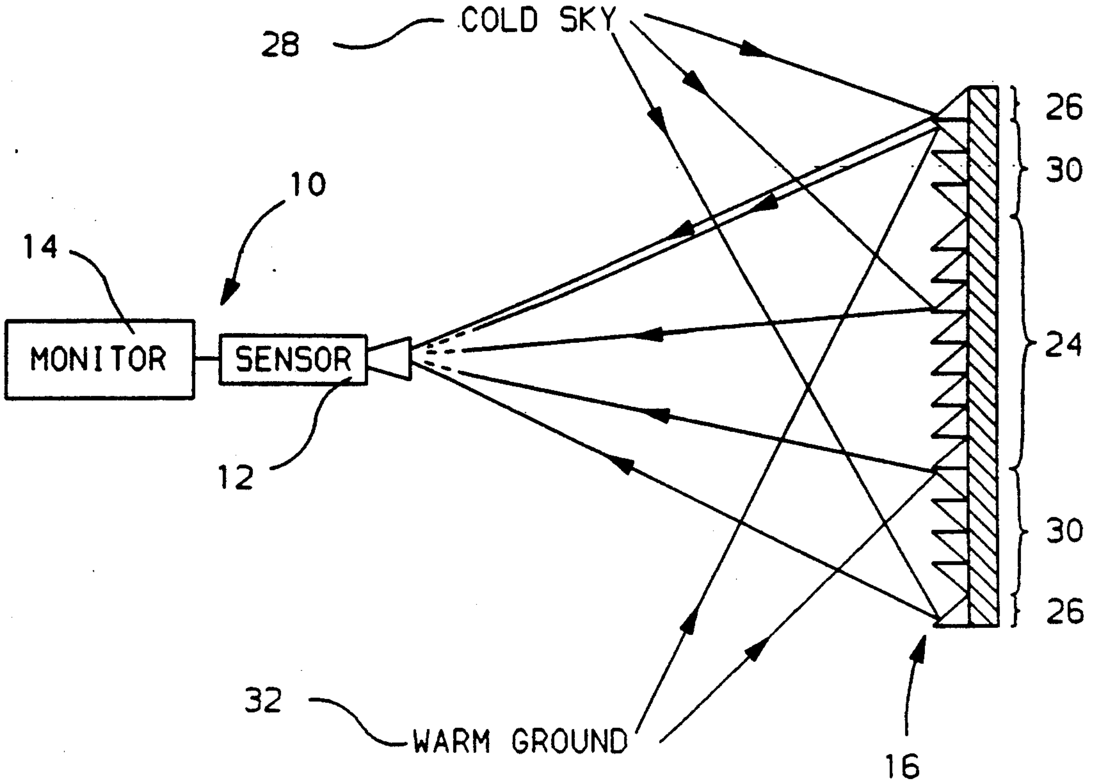
FIG. 1 is a schematic diagram illustrating the principles of the invention.

Referring to FIG. 1, a vehicle borne infrared vision system 10 includes a sensor 12 for detecting infrared radiation received from a scene and a monitor 14 for displaying an image of the detected scene. The amount of contrast between different portions of the displayed image is based upon the amount of detectible difference in the intensity of the radiation received from the corresponding portions of the scene. In turn, the intensity of the radiation received from any given portion of the scene is related to the effective infrared temperature of that portion of the scene—the greater the effective infrared temperature, the greater the intensity of the infrared radiation.

The image produced by the monitor 14 may be in color or black and white (monochromatic). It monochromatic, black may represent a relatively hot effective infrared temperature and white may represent a relatively cold effective infrared temperature, or the polarity may be reversed with white representing hot and black representing cold. For the sake of simplicity, it will be assumed that the image produced by the monitor 14 is monochromatic, with black representing hot and white representing cold. However, it will be understood that the invention is equally applicable to a monochromatic system of the opposite polarity or to a color system.

Figure 2:
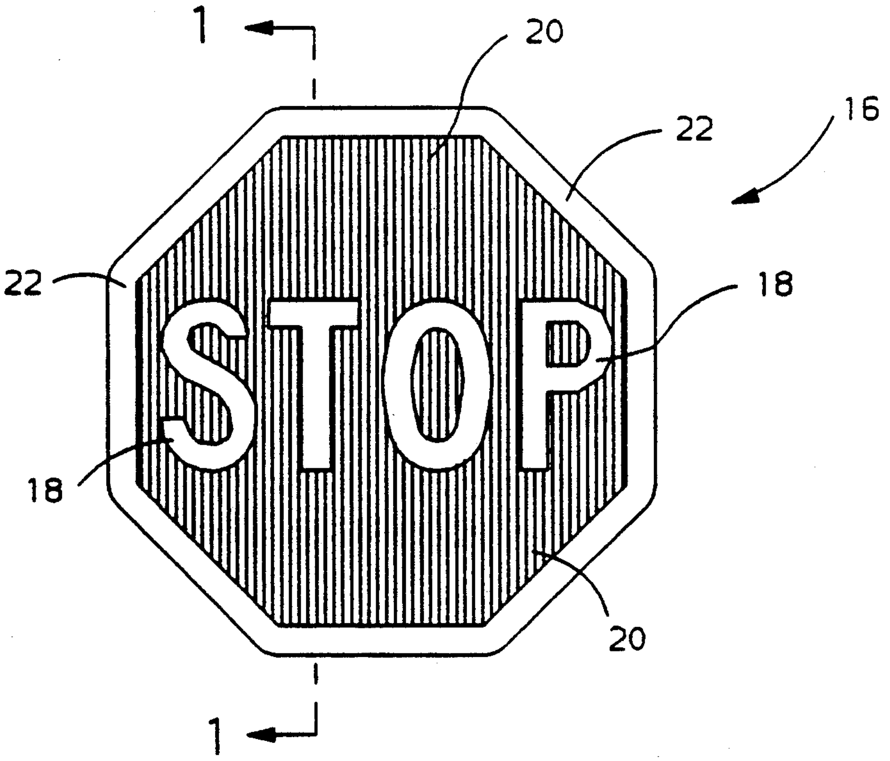
FIG. 2 is a pictorial view of a traffic sign useful in explaining the principles of the invention.

Referring to FIG. 2, the scene from which infrared radiation is received by the detector 12 may include a traffic sign, such as "STOP" sign 16. In this case, the surface of the sign 16 consists of white letters 18 on a dark background 20 (which may be red in color) and a white border 22. Because the entire surface of the sign 16 is at about the same effective infrared temperature, the intensity of detectible infrared radiation received by the detector 12 from the letters 18, the background 20 and the border 22 is about the same. As a result, within the image of the scene as displayed by the monitor 14, the contrast between the various portions 18, 20 and 22 of the sign 16 is low (if there is any contrast at all). The invention helps to alleviate this problem.

According to the invention, the sign 16 of FIG. 2 is equipped with a plurality of infrared reflective surfaces oriented so as to reflect infrared radiation to the detector 12 from one or more sources of contrast enhancing infrared radiation. This is illustrated in FIG. 1 where the sign 16, as modified in accordance with invention, is depicted in cross-section along the line 1—1 shown in FIG. 2 which extends vertically through the letter "T".

More specifically, referring to FIG. 1, the letters 18 of the sign 16 (including the letter "T") and the border 22 are covered by respective sets of infrared reflective surfaces 24 and 26 oriented so as to reflect contrast enhancing infrared radiation to the detector 12 from the sky 28 which is at a relatively cold effective infrared temperature at night. As a result, the letters 18 and border 22 of the sign 16 appear white within the displayed image produced by the monitor 14 than would be the case without the reflective surfaces 24 and 26.

Similarly, the background 20 of the sign 16 is covered by a set of infrared reflective surfaces 30 oriented so as to reflect contrast enhancing infrared radiation to the detector 12 from the ground 32 which is at a relatively warm temperature at night. As a result, the background 20 of the sign 16 appears blacker within the displayed image produced by the monitor 14 than would otherwise be the case.

For the maximum contrast enhancement within the displayed image produced by the monitor 14, it is desirable that the respective sets of reflective surfaces 24, 26 and 30 be employed in combination as illustrated in FIG. 1. However, it will be appreciated that the invention is still effective if only one of the sets of reflective surfaces 24 and 30 is employed.

The reflective surfaces of the sets 24, 26 and 30 may be formed of any suitable infrared reflective material such as glass, plastic or metal. Where the sign 16 is made of such as infrared reflective material, the reflective surfaces 24, 26 and 30 of the invention may be formed in the surface of the sign 16 itself. Alternatively, the material of which the reflective surfaces 24, 26 and 30 are formed may be mounted on the surface of the sign 16. As an example, the reflective surfaces 24, 26 and 30 may be affixed to the surface of the sign 16 by adhesive tape, paint or any other suitable means. Further, the material of which the infrared reflective surfaces 24, 26 and 30 are formed may be either transparent or reflective to visible radiation to provide visible as well as infrared image contrast.

In addition, it will be appreciated that the invention embraces the use of contrast enhancing infrared radiation sources other than the sky 28 or the ground 32. For instances, the ground 32 could be replaced by a heated surface, such as a lamp utilized to visibly illuminate the sign 16 (thereby providing an infrared as well as illuminated sign 16). It will also be understood that although the foregoing embodiments of the invention have been described in respect to cars and trucks, the invention may also prove useful with other types of vehicles such as boats, airplanes, etc.

What is claimed is:

1. For use in conjunction with a vehicle borne infrared vision system including a detector for detecting infrared radiation received from a scene and a monitor for displaying an image of the detected scene in which the amount of contrast between different portions of the displayed image is based upon the amount of detectible difference in the intensity of the infrared radiation received from the corresponding portions of the scene;

an improvement for increasing within the displayed image of the scene the contrast between a particular indicia and an adjacent portion of the scene, the improvement comprising:

means for defining the indicia to be contrasted within the displayed image of the scene, the means including one or more infrared reflective surfaces oriented so as to reflect infrared radiation to the detector from a contrast enhancing source of infrared radiation having an intensity which is detectibly different form the intensity of infrared radiation received from the adjacent portion of the scene by an amount which is greater than would be the case without the infrared reflective surfaces, the contrast enhancing source of infrared radiation being at least one of the sky and the ground.

* * * * *